United States Patent
Peters

(10) Patent No.: US 10,012,104 B2
(45) Date of Patent: Jul. 3, 2018

(54) GAS TURBINE ENGINE CONVERGENT/DIVERGENT NOZZLE WITH UNITARY SYNCHRONIZATION RING FOR ROLLER TRACK NOZZLE

(71) Applicant: UNITED TECHNOLOGIES CORPORATION, Hartford, CT (US)

(72) Inventor: Donald W Peters, Colchester, CT (US)

(73) Assignee: United Technologies Corporation, Farmington, CT (US)

(*) Notice: Subject to any disclaimer, the term of this patent is extended or adjusted under 35 U.S.C. 154(b) by 343 days.

(21) Appl. No.: 14/822,973

(22) Filed: Aug. 11, 2015

(65) Prior Publication Data

US 2016/0102574 A1   Apr. 14, 2016

Related U.S. Application Data

(60) Provisional application No. 62/063,524, filed on Oct. 14, 2014.

(51) Int. Cl.

| | | |
|---|---|---|
| *F02K 1/00* | (2006.01) | |
| *F01D 17/16* | (2006.01) | |
| *F01D 9/02* | (2006.01) | |
| *F02K 1/12* | (2006.01) | |
| *F02K 3/10* | (2006.01) | |

(52) U.S. Cl.
CPC .............. *F01D 17/16* (2013.01); *F01D 9/02* (2013.01); *F02K 1/1223* (2013.01); *F02K 3/10* (2013.01); *F05D 2220/32* (2013.01); *F05D 2220/323* (2013.01); *F05D 2230/30* (2013.01); *F05D 2230/53* (2013.01); *F05D 2240/128* (2013.01); *F05D 2250/141* (2013.01); *F05D 2250/323* (2013.01); *F05D 2250/324* (2013.01); *F05D 2260/50* (2013.01); *Y02T 50/671* (2013.01)

(58) Field of Classification Search
CPC . F02K 1/09; F02K 1/12; F02K 1/1223; F02K 1/15; F02K 1/06
See application file for complete search history.

(56) References Cited

U.S. PATENT DOCUMENTS

| | | |
|---|---|---|
| 3,730,436 A | 5/1973 | Madden et al. |
| 4,141,501 A | 2/1979 | Nightingale |
| 4,456,178 A | 6/1984 | Jones et al. |
| 4,892,254 A | 1/1990 | Schneider et al. |
| 5,011,080 A | 4/1991 | Barcza et al. |
| 5,494,221 A * | 2/1996 | Cot .................... F02K 1/1223 239/265.19 |
| 5,797,544 A | 8/1998 | Ward |
| 5,842,643 A | 12/1998 | Lippmeier |
| 6,398,129 B1 | 6/2002 | Johnson |
| 6,779,336 B2 | 8/2004 | Allore et al. |
| 7,007,483 B2 | 3/2006 | Peters |

(Continued)

OTHER PUBLICATIONS

EP Official Action dated Aug. 30, 2017 for EP Application No. 15180973.8.

*Primary Examiner* — Gerald L Sung
(74) *Attorney, Agent, or Firm* — Bachman & LaPointe, P.C.

(57) ABSTRACT

A nozzle system includes a static structure including a multiple of convergent flap rails and a synchronization ring including an inner ring radially spaced from an outer ring via a multiple of struts. The multiple of convergent flap rails extend at least partially between the inner ring and the outer ring.

13 Claims, 8 Drawing Sheets

(56) References Cited

U.S. PATENT DOCUMENTS

| | | | |
|---|---|---|---|
| 7,117,682 | B1 | 10/2006 | Sevi et al. |
| 7,225,622 | B2 | 6/2007 | Petty et al. |
| 7,261,489 | B2 | 8/2007 | Arbona et al. |
| 7,377,099 | B2 | 5/2008 | Cowan et al. |
| 7,546,738 | B2 | 6/2009 | Peters |
| 7,555,904 | B1 | 7/2009 | Osga et al. |
| 7,849,696 | B2 | 12/2010 | De Sousa et al. |
| 8,454,290 | B2 | 6/2013 | Schaser et al. |
| 2001/0018024 | A1 | 8/2001 | Hyde et al. |
| 2003/0123953 | A1 | 7/2003 | Razzell |
| 2007/0220735 | A1 | 9/2007 | Arbona et al. |
| 2008/0078163 | A1 | 4/2008 | Burdick et al. |
| 2009/0065610 | A1 | 3/2009 | Cowan et al. |
| 2009/0269497 | A1* | 10/2009 | Yousefiani ............ B22F 3/1055 427/258 |

\* cited by examiner

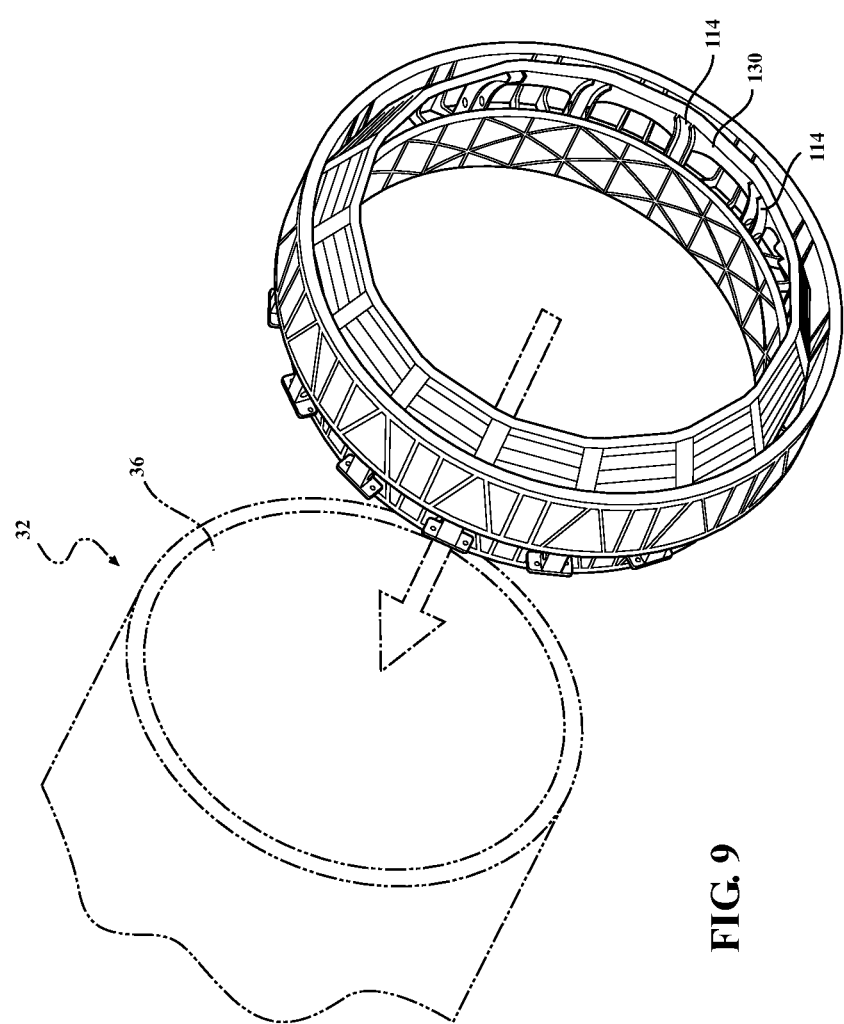

GAS TURBINE ENGINE CONVERGENT/DIVERGENT NOZZLE WITH UNITARY SYNCHRONIZATION RING FOR ROLLER TRACK NOZZLE

CROSS REFERENCE TO RELATED APPLICATION

This application claims the benefit of provisional application Ser. No. 62/063,524 filed Oct. 14, 2014.

STATEMENT REGARDING FEDERALLY SPONSORED RESEARCH OR DEVELOPMENT

This disclosure was made with Government support under FA8650-09-D-2923-AETD awarded by The United States Air Force. The Government has certain rights in this disclosure.

BACKGROUND

The present disclosure relates to a gas turbine engine and, more particularly, to a nozzle system therefor.

Gas turbine engines, such as those which power modern military aircraft, include a compressor section to pressurize a supply of air, a combustor section to burn a hydrocarbon fuel in the presence of the pressurized air, and a turbine section to extract energy from the resultant combustion gases and generate thrust. Downstream of the turbine section, an augmentor section, or "afterburner", is operable to selectively increase thrust. The increase in thrust is produced when fuel is injected into the core gases downstream of the turbine section and burned with the oxygen contained therein to generate a second combustion that is then passed through a variable area nozzle system.

A variable area nozzle such as a convergent/divergent (C/D) nozzle optimizes the thrust produced within the gas turbine engine by provision of a multitude of nozzle positions. The term "convergent-divergent" describes a nozzle having a convergent section upstream of a divergent section. Gases from the turbine section pass through the decreasing diameter convergent section before passing through the increasing diameter divergent section. Convergent/Divergent (C/D) nozzles may be configured for an augmented or an un-augmented engine in a two or three-dimensional configuration with, or without, the capability to vector.

The nozzle defines a throat area and an exit area. The throat area is the minimum cross sectional area of the nozzle and is defined by the interface between an aft portion of the convergent section and a forward portion of the divergent section. The exit area is the cross sectional area measured at the aft most portion of the divergent section. The area ratio of a nozzle is the exit area divided by the throat area. The area ratio range provides a general indicator of engine performance and an increase in the area ratio range results in more efficient engine performance with increased engine thrust, fuel efficiency and a decrease in actuator loads required to articulate the nozzle as the engine power setting increases.

The convergent and divergent sections each generally include circumferentially disposed flaps and flap seals. The alternately disposed flaps and flap seals accommodate changes in jet area and nozzle axis skew (if the nozzle is vectorable). Support for such changes in area and nozzle axis skew requires a lightweight yet rigid interface between the nozzle section and the upstream attachment thereof.

SUMMARY

A nozzle system according to one disclosed non-limiting embodiment of the present disclosure includes a static structure including a multiple of convergent flap rails; and a synchronization ring of a unitary structure adjacent the static structure, the synchronization ring including an inner ring radially spaced from an outer ring via a multiple of struts, the multiple of convergent flap rails extend at least partially between the inner ring and the outer ring.

A further embodiment of the present disclosure includes, wherein the multiple of convergent flap rails are circumferentially spaced about an engine axis, the multiple of struts arranged in pairs such that each strut is defined along an axis that intersects with the engine axis.

A further embodiment of any of the foregoing embodiments of the present disclosure includes, wherein each of the multiple of convergent flap rails includes a first radial wall, a second radial wall, and an outer wall therebetween.

A further embodiment of any of the foregoing embodiments of the present disclosure includes, wherein an aft section of each of the multiple of convergent flap rails curves toward an engine axis.

A further embodiment of any of the foregoing embodiments of the present disclosure includes, wherein the aft section includes a track to at least partially support each of a multiple of convergent flaps.

A further embodiment of any of the foregoing embodiments of the present disclosure includes, wherein each of the multiple of convergent flaps are pivotally coupled to the inner ring at an inner hinge interface.

A further embodiment of any of the foregoing embodiments of the present disclosure includes, further comprising a multiple of divergent flaps, each of the multiple of divergent flaps are respectively pivotally coupled to one of the multiple of convergent flaps.

A further embodiment of any of the foregoing embodiments of the present disclosure includes a multiple of links, each of the multiple of links pivotally coupled to the outer ring at an outer hinge interface, and one of the multiple of divergent flaps.

A further embodiment of any of the foregoing embodiments of the present disclosure includes, wherein each of the multiple of links are pivotally coupled to a respective one of the multiple of divergent flaps at a midsection thereof.

A further embodiment of any of the foregoing embodiments of the present disclosure includes, wherein a forward section of each of the multiple of convergent flap rails include lightening apertures.

A further embodiment of any of the foregoing embodiments of the present disclosure includes, wherein the forward section of each of the multiple of convergent flap rails extend from a full ring aft section of the static structure.

A further embodiment of any of the foregoing embodiments of the present disclosure includes, wherein each of the multiple of convergent flap rails terminates with a flange.

A further embodiment of any of the foregoing embodiments of the present disclosure includes, wherein the outer wall of at least one of the multiple of convergent flap rails includes a groove to guide the synchronization ring.

A convergent/divergent nozzle system according to another disclosed non-limiting embodiment of the present disclosure includes a static structure including a multiple of convergent flap rails, an aft section of each of the multiple of convergent flap rails curves toward an engine axis; a synchronization ring of a unitary structure adjacent the static structure, the synchronization ring including an inner ring radially spaced from an outer ring via a multiple of struts, the multiple of convergent flap rails extend at least partially between the inner ring and the outer ring; and a multiple of convergent flaps engaged with the synchronization ring and the static structure, each of the multiple of convergent flaps pivotally coupled to the inner ring at an inner hinge interface and at least one of the multiple of convergent flap rails of the static structure.

A further embodiment of any of the foregoing embodiments of the present disclosure includes, wherein an aft section of each of the multiple of convergent flap rails curves toward an engine axis.

A further embodiment of any of the foregoing embodiments of the present disclosure includes, wherein the aft section of each of the multiple of convergent flap rails includes a track to at least partially support at least one of the multiple of convergent flaps.

A further embodiment of any of the foregoing embodiments of the present disclosure includes, wherein each of the multiple of convergent flaps includes a follower that rides in the respective track.

A further embodiment of any of the foregoing embodiments of the present disclosure includes a multiple of divergent flaps, each of the multiple of divergent flaps are respectively pivotally coupled to one of the multiple of convergent flaps.

A further embodiment of any of the foregoing embodiments of the present disclosure includes a multiple of links, each of the multiple of links pivotally coupled to the outer ring at an outer hinge interface, and one of the multiple of divergent flaps.

A further embodiment of any of the foregoing embodiments of the present disclosure includes, wherein each of the multiple of convergent flap rails are associated with one of the multiple of divergent flaps and one of the multiple of convergent flaps.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 9 is a perspective view of the synchronized ring assembled to the static structure of the nozzle system.

DETAILED DESCRIPTION

Figure 1:
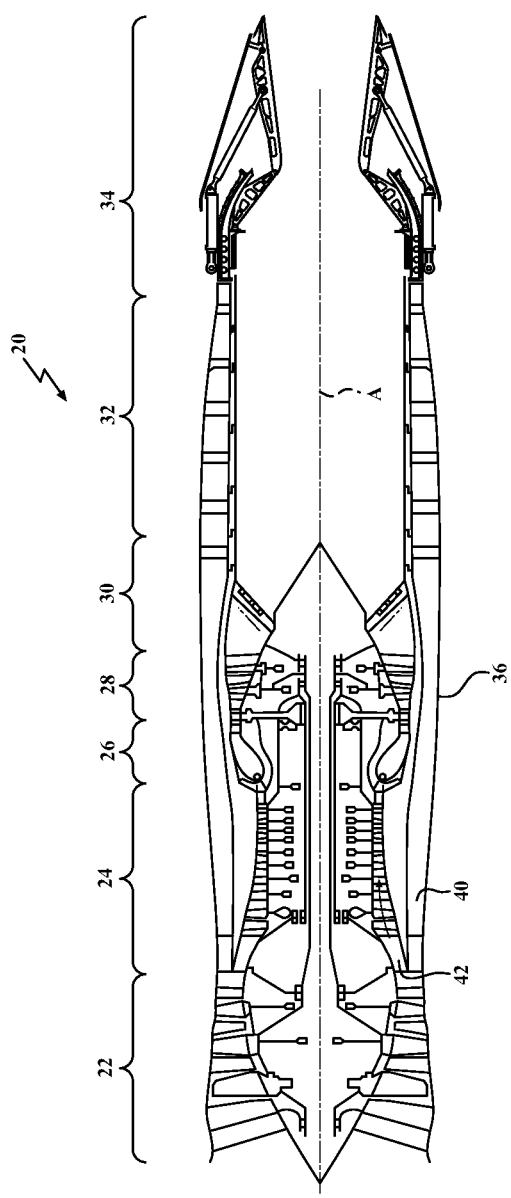
FIG. 1 is a general schematic view of an example gas turbine engine with a nozzle section according to one disclosed non-limiting embodiment.

FIG. 1 schematically illustrates a gas turbine engine 20. The gas turbine engine 20 is disclosed herein as a two-spool, low-bypass, augmented turbofan that generally incorporates a fan section 22, a compressor section 24, a combustor section 26, a turbine section 28, an augmenter section 30, a duct section 32, and a nozzle system 34 along a central longitudinal engine axis A. Although depicted as an augmented low bypass turbofan in the disclosed non-limiting embodiment, it should be appreciated that the concepts described herein are applicable to other gas turbine engines including non-augmented engines, geared architecture engines, direct drive turbofans, turbojet, turboshaft, multi-stream variable cycle, and other engine architectures with a nozzle system.

An outer case structure 36 and an inner case structure 38 define a generally annular secondary airflow path 40 around a core airflow path 42. Various structures and modules may define the outer case structure 36 and the inner case structure 38 which essentially define an exoskeleton to support rotational hardware therein. Air that enters the fan section 22 is divided between core airflow through the core airflow path 42, and secondary airflow through the secondary airflow path 40. The core airflow passes through the combustor section 26, the turbine section 28, then the augmentor section 30, where fuel may be selectively injected and burned to generate additional thrust through the nozzle system 34.

The secondary airflow may be utilized for a multiple of purposes to include, for example, cooling, pressurization and variable cycle operations. The secondary airflow as defined herein is any airflow different from the core airflow. The secondary airflow may ultimately be at least partially injected into the core airflow path 42 adjacent to the duct section 32 and the nozzle system 34. It should be appreciated that additional airflow streams, such as third stream airflow typical of variable cycle engine architectures, may additionally be provided.

Figure 2:
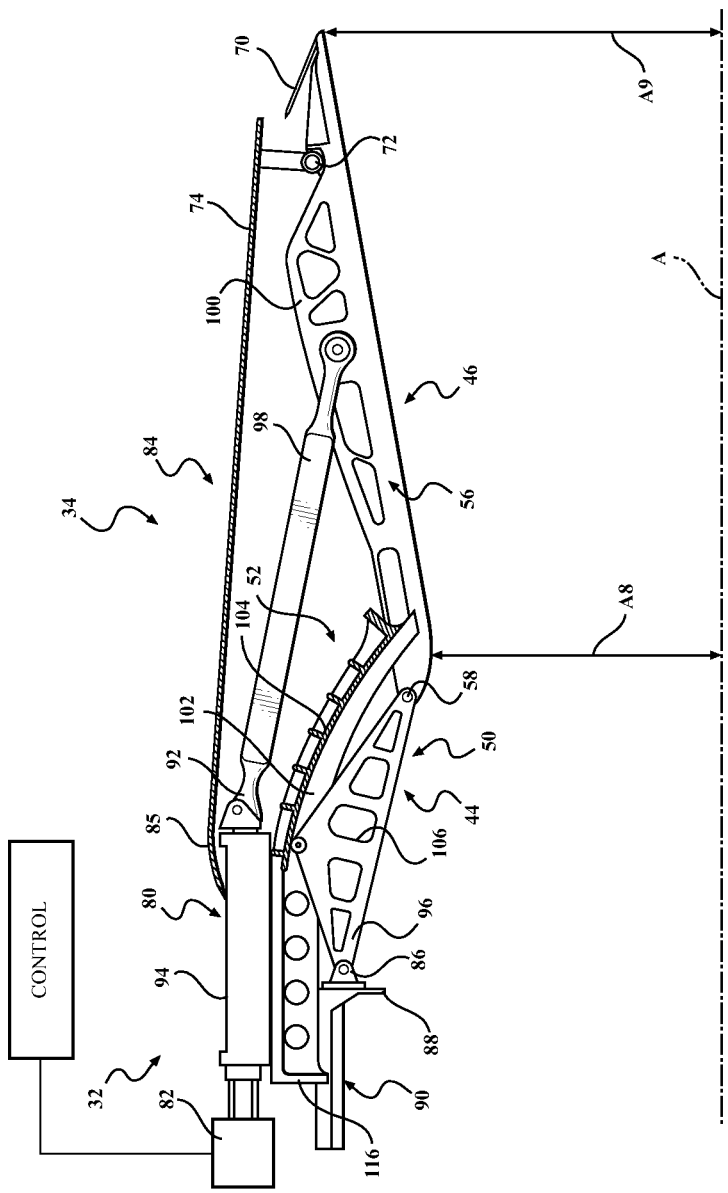
FIG. 2 is a cross-section of a convergent/divergent nozzle in a first position.

With reference to FIG. 2, the duct section 32 may be circular in cross-section as typical of an axisymmetric augmented low bypass turbofan that terminates in the Convergent/Divergent (C/D) nozzle system 34. The Convergent/Divergent (C/D) nozzle system 34 generally includes a convergent section 44 and a divergent section 46.

Figure 3:
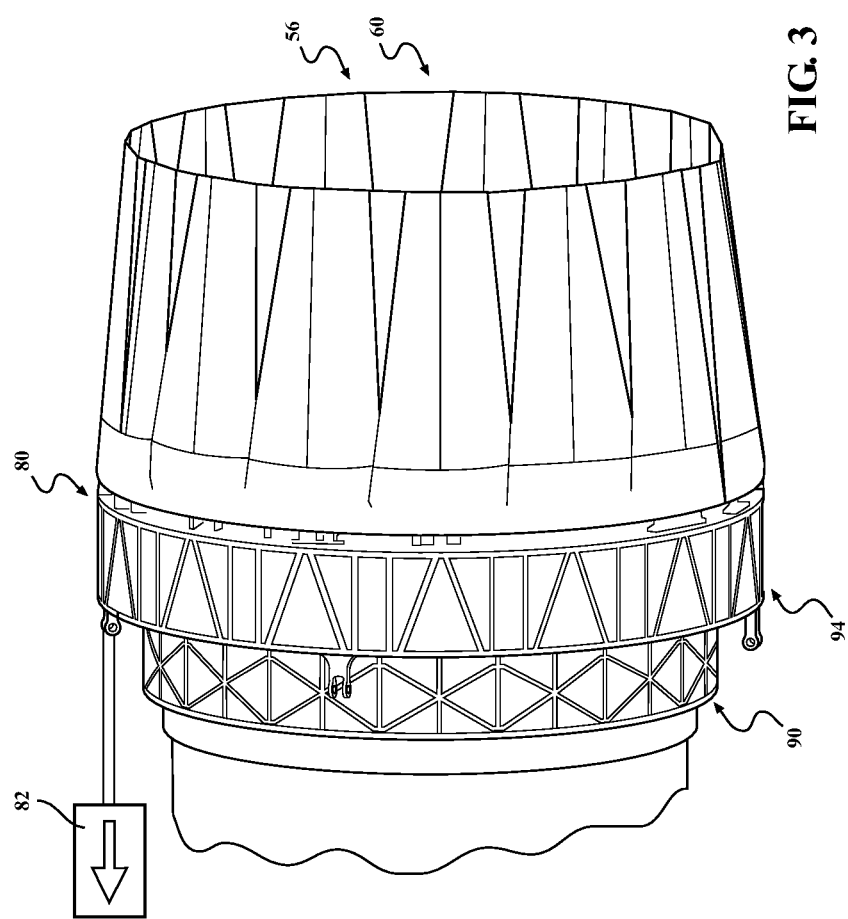
FIG. 3 is a perspective view of the convergent/divergent nozzle in the first position.

The convergent section 44 includes a multiple of circumferentially distributed convergent flaps 50 (only one shown in section), each pivotally coupled to a sync ring 80 (also shown separately in FIG. 7) that provides an interface between the nozzle system 34 and the duct section 32 upstream thereof. The synchronization ring 80 is slidably positioned with respect to a static structure 52 (also shown separately in FIG. 6) along the engine axis A. The divergent section 46 includes a multiple of circumferentially distributed divergent flaps 56 (only one shown in section) pivotally coupled at a joint 58 to an aft section of the convergent flaps 50. A multiple of divergent flap seals 60 (FIG. 3) are distributed circumferentially to at least partially overlap the adjacent divergent flaps 56.

Figure 4:
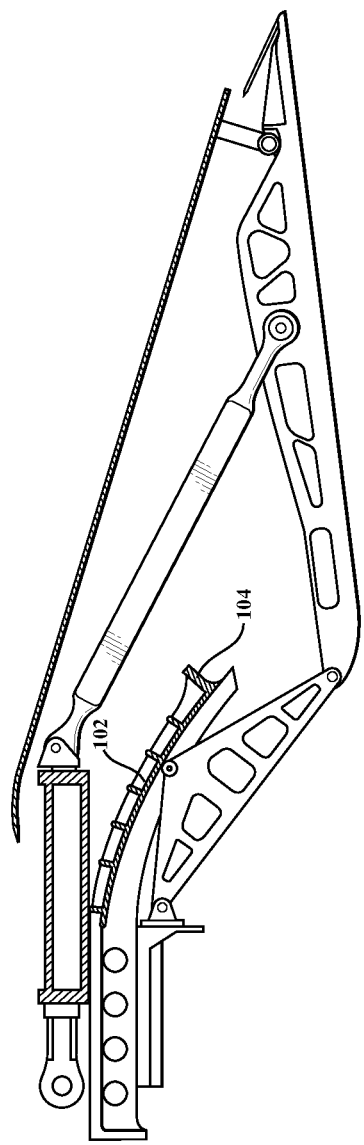
FIG. 4 is a cross-section of a convergent divergent nozzle in a second position.
Figure 5:
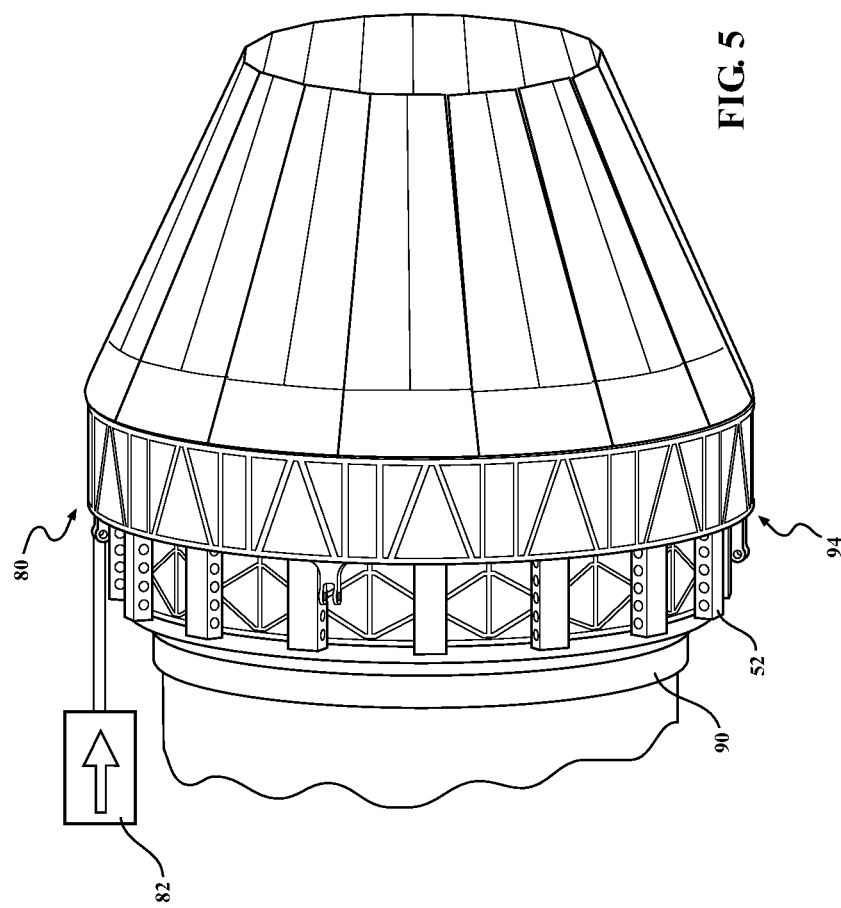
FIG. 5 is a perspective view of the convergent/divergent nozzle in the second position.

With continued reference to FIG. 2, an aft section of each divergent flap 56 may include a plow tip 70. It should be appreciated that separate, or integral, tip sections of various shapes and configurations will benefit herefrom. The plow tip 70 may be chiseled and associated with a hinge point 72 for attachment of an external flap 74. The external flap 74 pivots when the nozzle system 34 is moved between a maximum position (FIGS. 2 and 3) and a minimal position (FIGS. 4 and 5) to facilitate formation of a smooth aerodynamic surface when in the minimal position (FIGS. 4 and 5). Taken cooperatively, the convergent and divergent flaps and the convergent and divergent flap seals circumscribe the nozzle centerline A to define a variable outer boundary for the core airflow.

Figure 6:
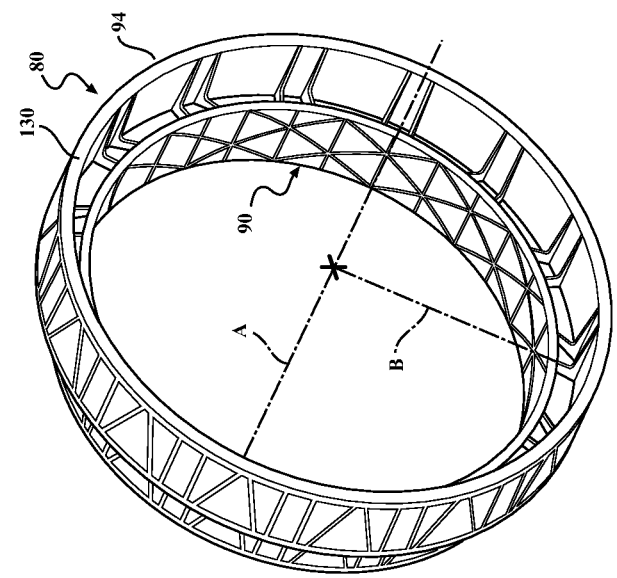
FIG. 6 is a perspective view of a static structure of the nozzle system.
Figure 7:
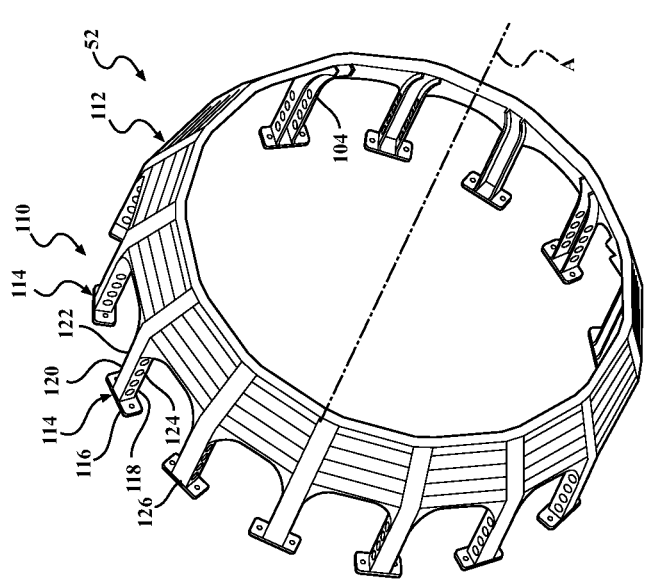
FIG. 7 is a perspective view of a synchronized ring of the nozzle system.

A control system (illustrated schematically) varies the nozzle system 34 via axial movement of the synchronization ring 80 (also shown separately in FIG. 7). The synchronization ring 80 is slidably positioned with respect to the static structure 52 (also shown separately in FIG. 6) along the engine axis A by actuators 82 (e.g., pneumatic or hydraulic actuators) in response to the control system to axially position the synchronization ring 80 with respect to the static structure 52. The synchronization ring 80 is coupled to each convergent/divergent flap pair by an associated linkage 84 to modulate a nozzle throat A8 and an exit A9 about a nozzle centerline A between the example maximum position (FIGS. 2 and 3) and the minimum position (FIGS. 4 and 5).

Each linkage 84 includes an inner hinge interface 86 on an aft end 88 of an inner ring 90 of the synchronization ring 80, and an outer hinge interface 92 on an aft end 85 of an outer ring 94 of the synchronization ring 80. Each inner hinge interface 86 is pivotally coupled to a respective convergent flap 50 at a leading edge 96 thereof. Each outer hinge interface 92 is mounted to a respective divergent flap 56 through a link 98 that is pivotally coupled proximate a mid-section 100 of the divergent flap 56. Each convergent flap 50 includes a follower 102 (e.g., pin, or bearing) that rides along a track 104 of the static structure 52. The follower 102 is located proximate a mid-section 106 of the convergent flap 50.

In operation, the axial position of the synchronization ring 80 along the engine axis A determines the nozzle throat area A8 and associated exit area A9 between the maximum position (FIGS. 2 and 3) and the minimum position (FIGS. 4 and 5). In the maximum position, the follower 102 of the convergent flap 50 is located at an upstream position along the track 104 (FIG. 2). To configure the nozzle system 34 to the minimum position (FIG. 4), the synchronization ring 80 is driven aft such that the follower 102 of each convergent flap 50 travels axial aft and radially inward along the track 104. Thus, a rearward shift of the synchronization ring 80 in response to the motive force of the actuators 82 (FIG. 5) relative to the static structure 52 drives the follower 102 of the convergent flap 50 along the track 104 and synchronously positions the divergent flaps 56 via the respective links 98.

Figure 8:
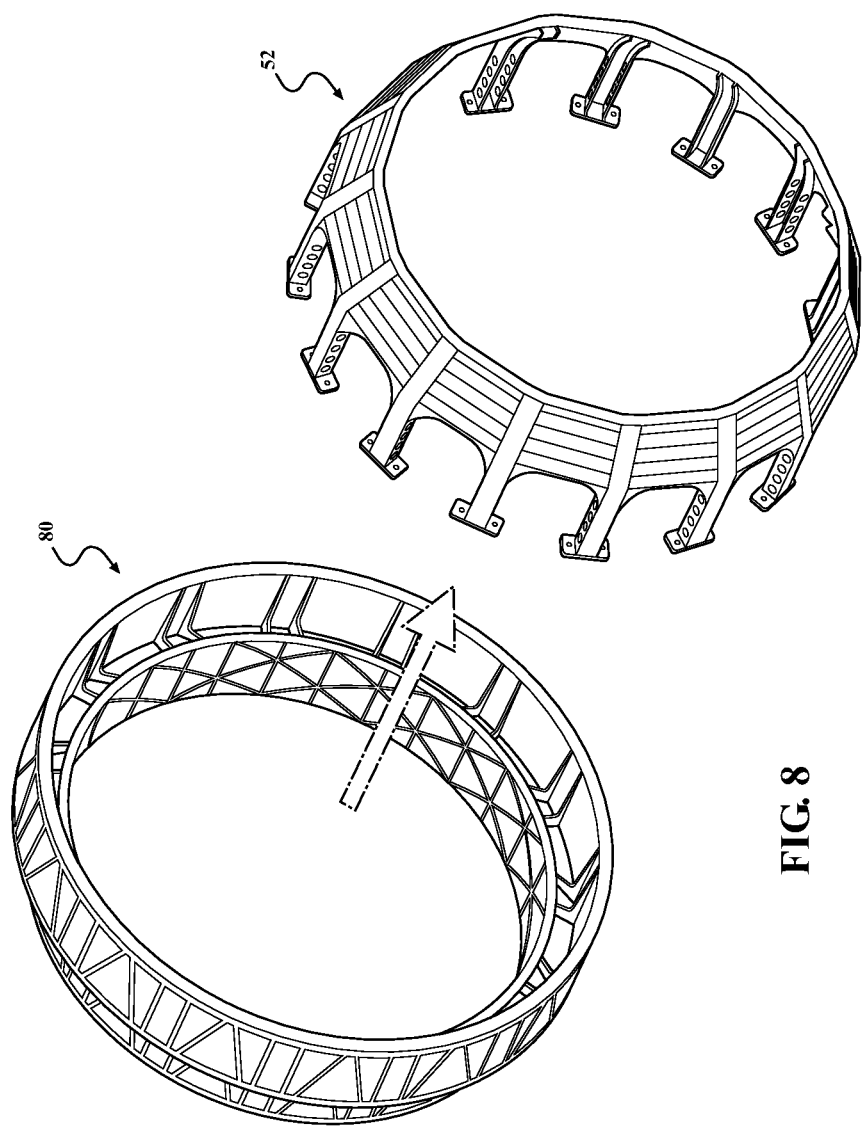
FIG. 8 is an exploded view of a portion of the nozzle system.

With reference to FIG. 6, the static structure 52 generally includes a circumferentially segmented forward section 110 and a full ring aft section 112. The circumferentially segmented forward section 110 is formed by a multiple of axially extending convergent flap rails 114 that define a generally constant diameter about the engine axis A. Each of the convergent flap rails 114 terminate opposite the full ring aft section 112 with a respective flange 116 that facilitates attachment to the outer case structure 36 of the duct section 32 (FIGS. 8 and 9).

The full ring aft section 112, in this disclosed non-limiting embodiment, circumferentially connects the convergent flap rails 114 to form a generally cupped shape that reduces in diameter fore to aft. It should be appreciated that the full ring aft section 112 may be of a constant radius, compound radius, or a multiple of essentially flat panels that interconnect the convergent flap rails 114 to provide radial support therefor.

Each of the convergent flap rails 114 includes a first radial wall 118, a second radial wall 120, and an outer wall 122 therebetween to form a generally "U" shape. The first radial wall 118 and the second radial wall 120 may include a multiple of lightening apertures 124 in the circumferentially segmented forward section 110 and first radial wall 118 and the second radial wall 120 in the full ring aft section 112 form the respective track 104. That is, the track 104 is essentially a groove in an inner surface of first radial wall 118 and the second radial wall 120 to guide the follower 102. The full ring aft section 112 thereby facilities a light weight, yet rigid track 104. It should be appreciated that the respective track 104 may be of various shapes, to include but not be limited to, "T", "I", etc.

The outer wall 122 on at least some of the multiple of axially extending convergent flap rails 114—here shown as five of fifteen—includes a guide slot 126—to at least partially guide the synchronization ring 80. That is, the outer ring 94 of synchronization ring 80 rides at least partially within the guide slots 126 to facilitate rotational alignment and prevent relative clocking. It should be appreciated that other interfaces may be provided so long as clocking is prevented.

With reference to FIG. 7, the synchronization ring 80 is a unitary structure in which the inner ring 90 is radially spaced from the outer ring 94 via a multiple of struts 130. That is, the synchronization ring 80 is manufactured as a completely integral unitary structure such as via additive manufacturing process that includes but are not limited to, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD) and Laser Powder Bed Fusion (LPBF).

The additive manufacturing process sequentially builds-up layers of atomized alloy and/or ceramic powder material that include but are not limited to, 625 Alloy, 718 Alloy, 230 Alloy, stainless steel, tool steel, cobalt chrome, titanium, nickel, aluminum and others in atomized powder material form. Alloys such as 625, 718 and 230 may have specific benefit for parts that operate in high temperature environments, such as, for example, environments typically encountered by aerospace and gas turbine engine components.

The inner ring 90 is also axially spaced forward of the outer ring 94. The struts 130 may be arranged in pairs such that each strut 130 is defined along an axis B that intersects with the axis A. Each of the convergent flap rails 114 extends between the strut pairs (FIG. 9). That is, two struts 130 are circumferentially located between each convergent flap rail 114. It should be appreciated, however, that any number may be utilized.

The circumferentially segmented forward section 110 permits the synchronization ring 80 to be of unitary structure, with an increase in stiffness, a decrease in weight, and thus a nozzle system 34 of increased positional accuracy. That is, the reduced deflections provided by the unitary static structure 52 require less to compensate for deflections by the control system. The nozzle system 34 may be engineered as a redesign of an existing nozzle or otherwise engineered for an existing environment (e.g., as a drop-in replacement for an existing nozzle).

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to normal operational attitude and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A nozzle system comprising:
   a static structure comprising a circumferentially segmented forward section and a full ring aft section, said circumferentially segmented forward section formed by a multiple of axially extending convergent flap rails that curve toward an engine axis and define a generally constant diameter about said engine axis, each of said convergent flap rails terminate opposite the full ring aft section with a respective flange attachable to an outer case structure of an engine duct section;
   a synchronization ring adjacent said static structure, said synchronization ring a completely integral unitary structure including an inner ring radially spaced and axially spaced forward from an outer ring via a multiple of struts, said multiple of convergent flap rails extend at least partially between said inner ring and said outer ring, the multiple of struts arranged in pairs such that each strut is defined along an axis that intersects with the engine axis;
   a multiple of convergent flaps engaged with said synchronization ring and said static structure, each of said multiple of convergent flaps being pivotally coupled to said inner ring at an inner hinge interface and at least one of said multiple of convergent flap rails of said static structure, a forward section of each of said multiple of convergent flap rails is circumferentially segmented;
   a multiple of divergent flaps, each of said multiple of divergent flaps being respectively pivotally coupled to one of said multiple of convergent flaps; and
   a multiple of links, each of said multiple of links pivotally coupled to said outer ring at an outer hinge interface, and one of said multiple of divergent flaps.

2. The nozzle system as recited in claim 1, wherein each of said multiple of convergent flap rails includes a first radial wall, a second radial wall, and an outer wall therebetween.

3. The nozzle system as recited in claim 2, wherein an aft section of each of said multiple of convergent flap rails curves toward the engine axis.

4. The nozzle system as recited in claim 1, wherein each of said multiple of links are pivotally coupled to the respective one of said multiple of divergent flaps at a midsection thereof.

5. The nozzle system as recited in claim 1, wherein the forward section of each of said multiple of convergent flap rails include lightening apertures.

6. The nozzle system as recited in claim 5, wherein said forward section of each of said multiple of convergent flap rails extend from the full ring aft section of said static structure.

7. The nozzle system as recited in claim 2, wherein said outer wall of at least one of said multiple of convergent flap rails includes a groove to guide said synchronization ring.

8. The nozzle system as recited in claim 1, wherein said synchronization ring is additively manufactured.

9. A convergent/divergent nozzle system comprising:
   a static structure comprising a circumferentially segmented forward section and a full ring aft section, said circumferentially segmented forward section formed by a multiple of axially extending convergent flap rails that curve toward an engine axis and define a generally constant diameter about said engine axis, each of said convergent flap rails terminate opposite the full ring aft section with a respective flange attachable to an outer case structure of an engine duct section;
   an additively manufactured synchronization ring adjacent said static structure, said additively manufactured synchronization ring including an inner ring radially spaced from an outer ring via a multiple of struts, said multiple of convergent flap rails extend at least partially between said inner ring and said outer ring;
   a multiple of convergent flaps engaged with said additively manufactured synchronization ring and said static structure, each of said multiple of convergent flaps pivotally coupled to said inner ring at an inner hinge interface and at least one of said multiple of convergent flap rails of said static structure;
   a multiple of divergent flaps, each of said multiple of divergent flaps being respectively pivotally coupled to one of said multiple of convergent flaps; and
   a multiple of links, each of said multiple of links pivotally coupled to said outer ring at an outer hinge interface, and one of said multiple of divergent flaps.

10. The convergent/divergent nozzle system as recited in claim 9, wherein an aft section of each of said multiple of convergent flap rails curves toward the engine axis.

11. The convergent/divergent nozzle system as recited in claim 10, wherein said aft section of each of said multiple of convergent flap rails includes a track to at least partially support at least one of said multiple of convergent flaps.

12. The convergent/divergent nozzle system as recited in claim 11, wherein each of said multiple of convergent flaps includes a follower that rides in said respective track.

13. The convergent/divergent nozzle system as recited in claim 12, wherein each of said multiple of convergent flap rails are associated with one of said multiple of divergent flaps and one of said multiple of convergent flaps.

* * * * *